United States Patent [19]

Wu

[11] Patent Number: 5,096,024
[45] Date of Patent: Mar. 17, 1992

[54] ADJUSTABLE MAGNETIC BRAKE

[76] Inventor: Hung-Chi Wu, 958-2, Ghung Shan Rd., Tao-Yuan, Taiwan

[21] Appl. No.: 565,062

[22] Filed: Aug. 10, 1990

[51] Int. Cl.$^5$ ............................ F16F 15/03; B60L 7/28
[52] U.S. Cl. ................................... 188/267; 188/164; 192/84 PM; 272/129; 310/105
[58] Field of Search ................ 188/267, 164; 310/105; 242/288, 147 M; 272/129; 192/84 PM, 84 E

[56] References Cited

U.S. PATENT DOCUMENTS

| 2,484,138 | 10/1949 | Winther | 310/105 |
| 2,771,171 | 11/1956 | Schultz | 192/84 PM |
| 2,983,350 | 5/1961 | Schultz | 192/84 PM |
| 3,627,445 | 12/1971 | Andriussi | 310/105 X |

FOREIGN PATENT DOCUMENTS

| 367387 | 5/1990 | European Pat. Off. | 310/105 |
| 148170 | 11/1981 | Japan | 310/105 |
| 234043 | 9/1989 | Japan | 310/105 |
| 719303 | 12/1954 | United Kingdom | 310/105 |

Primary Examiner—George E. A. Halvosa
Attorney, Agent, or Firm—Morton J. Rosenberg; David I. Klein

[57] ABSTRACT

This invention relates to an adjustable magnetic brake and in particular to one including an aluminum fan, a magnetic conducting ring enclosing the aluminum fan, a permanent magnet disposed within the aluminum fan, a fixing seat for keeping the permanent magnet in position, a sliding seat mounted in the fixing seat and provided with a bearing, a housing, bolts provided on one side of the fixing seat and extending out of the housing, a mounting plate connected with the bolts and a wire connected with the mounting plate such that when the wire is pulled outwards, the permanent magnet will be moved outwards.

3 Claims, 4 Drawing Sheets

ADJUSTABLE MAGNETIC BRAKE

BACKGROUND OF THE INVENTION

It is found that the commonly used brakes on the exercising devices are of the frictional type, the hydraulic type, the fanning type and the generator type. However, the frictional type is easily worn out and unsteady in use. As to the hydraulic type, there will be the problems of oil leaking, noise and insufficient braking torque at high temperature. Regarding the fanning type, it is too large in size and is difficult to adjust. The generator type is complicated in structure and expensive in cost.

It is, therefore, an object of the present invention to provide an adjustable magnetic brake which may obviate and mitigate the above-mentioned drawbacks.

SUMMARY OF THE INVENTION

This invention relates to an adjustable magnetic brake.

It is the primary object of the present invention to provide an adjustable magnetic brake which utilizes eddy currents to produce the required torque for braking.

It is another object of the present invention to provide an adjustable magnetic brake which is compact in size.

It is still another object of the present invention to provide an adjustable magnetic brake which is lightweight.

It is still another object of the present invention to provide an adjustable magnetic brake which is steady in use.

It is a further object of the present invention to provide an adjustable magnetic brake which is easily maintained.

It is still a further object of the present invention to provide an adjustable magnetic brake which is economic to produce.

DETAILED DESCRIPTION OF THE PREFERRED EMBODIMENT

Figure 1:
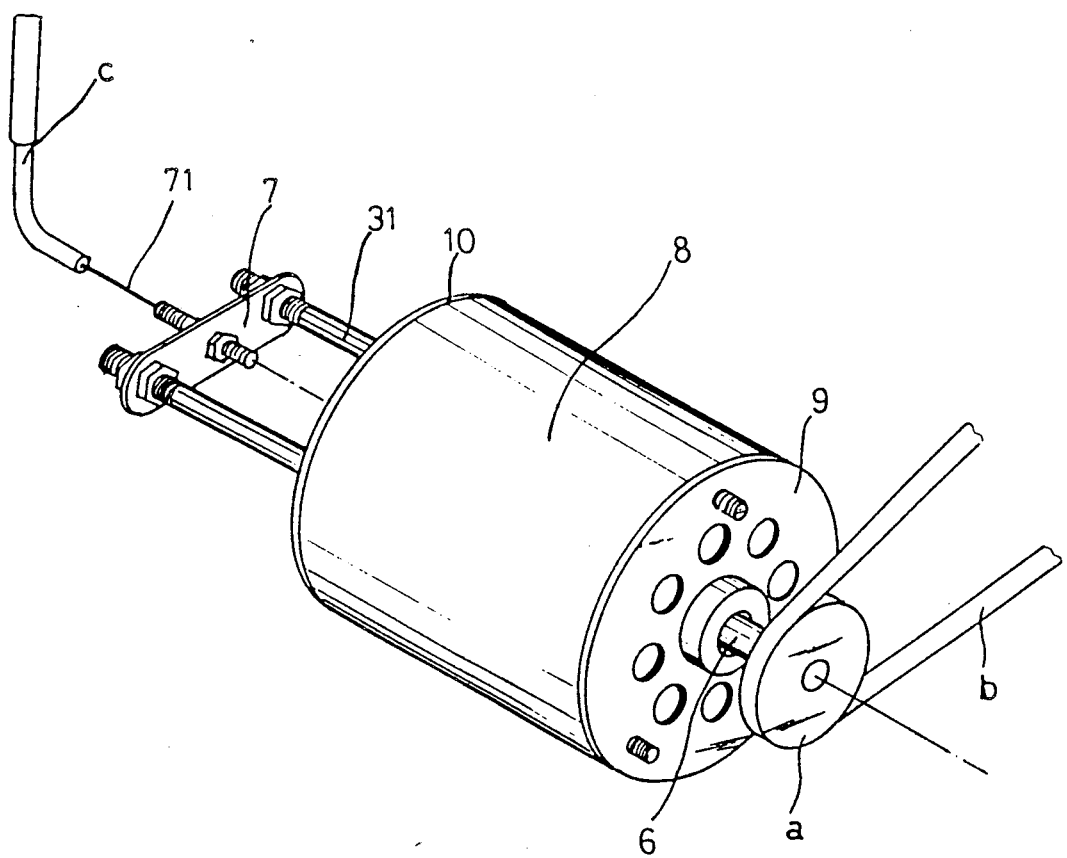
FIG. 1 is perspective view of an adjustable magnetic brake according to the present invention.
Figure 2:
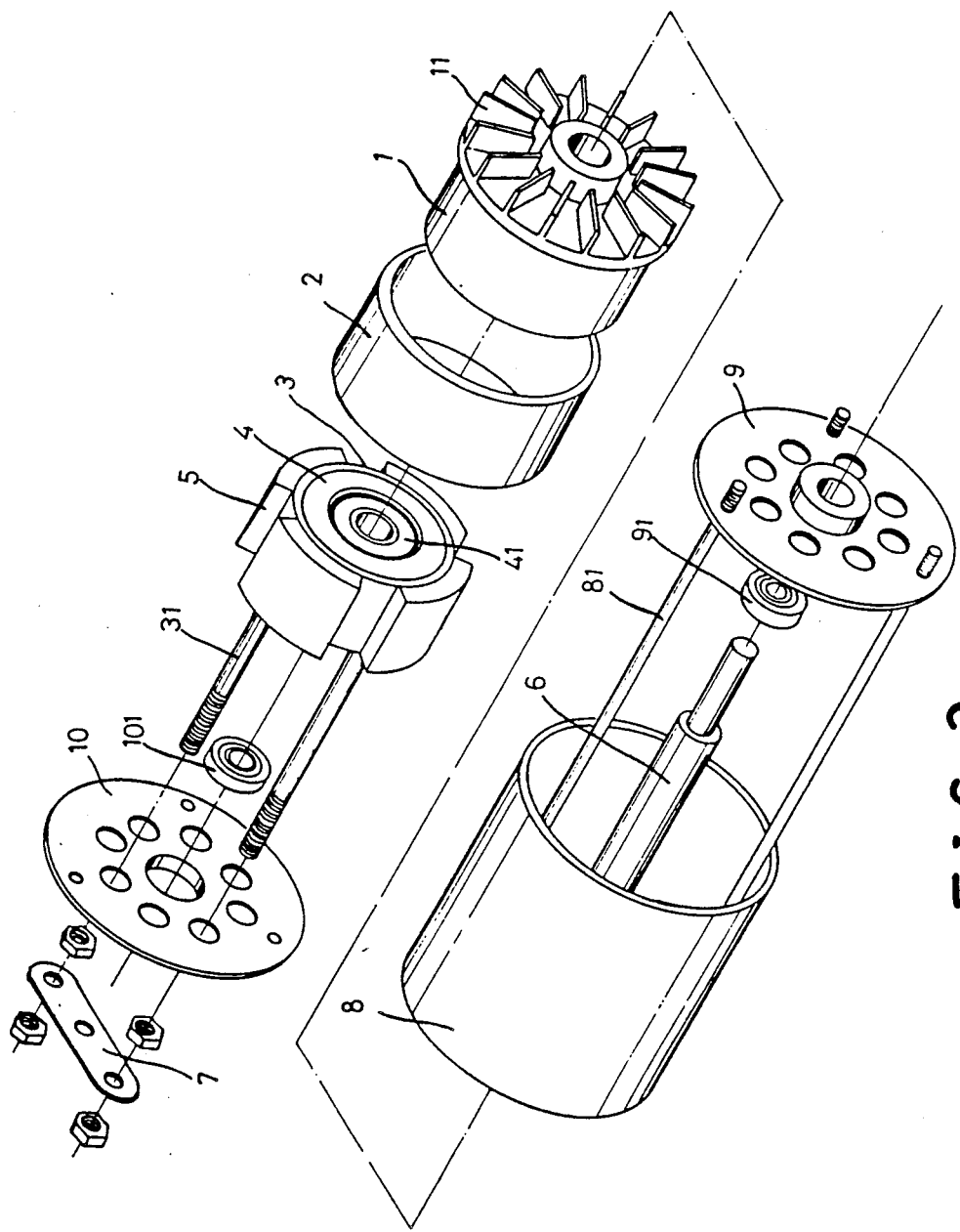
FIG. 2 is an exploded view of the adjustable magnetic brake.

With reference to the drawings and in particular to FIG. 1 thereof, the adjustable magnetic brake according to the present invention is connected to a belt (b) via a pulley (a) at one end and to a brake wire (c) at the other. FIG. 2 shows the structure of the present invention which mainly comprises an aluminum fan 1, a magnetic conducting ring 2, a fixing seat 3, a sliding seat 4, a permanent magnet 5, an axle 6, a mounting plate 7, a housing 8, an upper cover 9, and a lower cover 10. The aluminum fan 1, the magnetic conducting ring 2, the fixing seat 3, the sliding seat 4 and the permanent 5 are all put on to the axle 6 and disposed within the housing 8. The aluminum fan 1 is provided with a plurality of blades 11 at one end and fitted between the permanent magnet 5 and the magnet conducting ring 2. The permanent magnet 5 is fixed on the fixing seat 3 while the sliding seat 4 is mounted in the permanent magnet 5. A bearing 41 is installed within the sliding magnet 5. Two bolts 31 are provided on one side of the fixing seat 3 and extend through the lower cover 10 to connect the mounting plate 7. The upper cover 9 and the lower cover 10 are provided with bearings 91 and 101 respectively for supporting the axle 6 and is kept in fixed connection with the housing 8 by screws 81.

Figure 3:
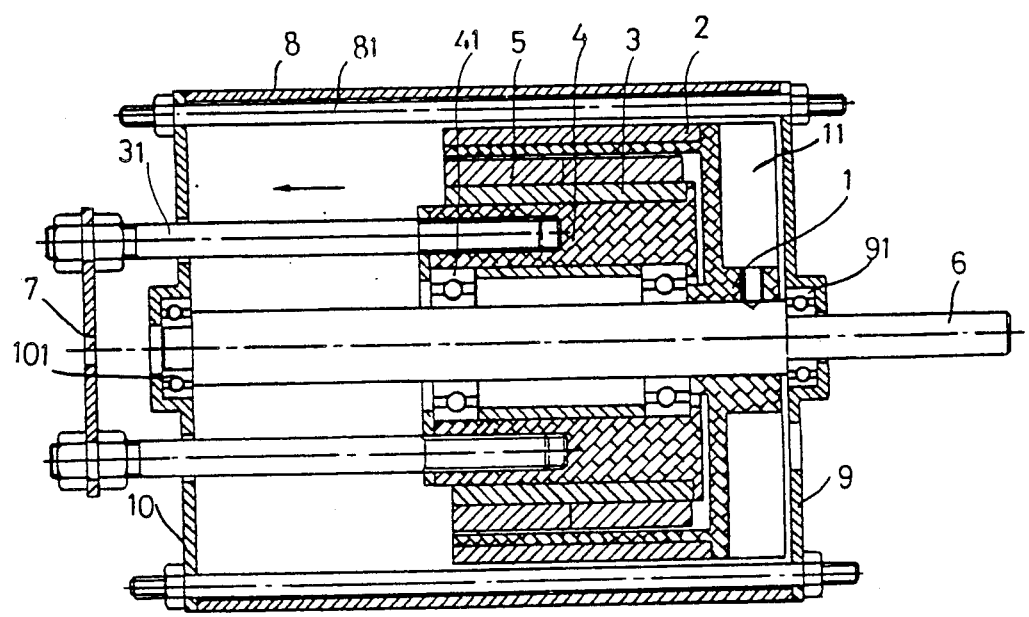
FIG. 3 is a sectional view of the adjustable magnetic brake.

Looking now at FIG. 3, as the aluminum fan 1 and the magnetic conducting ring 2 rotate with respect to the permanent magnet 5, a magnetic path will be formed between the permanent magnet and the magnetic conducting ring 2 so that when the aluminum fan 1 cuts through the magnetic path, an eddy current will be generated in the aluminum fan 1 thereby producing a braking torque. When the permanent magnet 5 is completely disposed within the aluminum fan 1, the braking torque will be at a maximum. As the permanent magnet 5 is pulled outwards by the braking wire 71, the coupling area between the permanent magnet 5 and the aluminum fan 1 will be decrease, thereby decreasing the braking torque. Since the permanent magnet 5 may be continuously moved, the braking torque may be adjusted steplessly.

Figure 4:
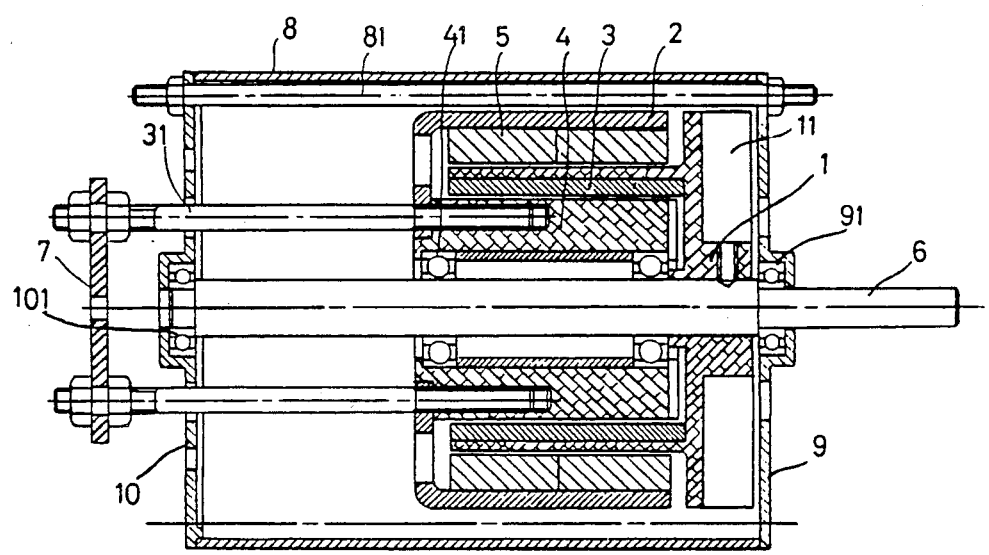
FIG. 4 is a sectional view of another embodiment of the present invention.

It should be noted, however, that the permanent magnet 5 may be modified as shown in FIG. 4 in which the aluminum fan 1 is disposed within the permanent magnet 5.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. An adjustable magnetic brake, comprising:

a longitudinally extended housing;

a rotatably driven shaft extending longitudinally through said housing, said shaft being supported by a pair of bearing members, each of said bearing members being disposed on an opposing end of said housing;

aluminum rotor means coupled to said rotatably driven shaft for providing a conductive path for eddy currents and substantially simultaneously dissipating heat generated by said conduction of said eddy currents, said aluminum rotor means including (1) a longitudinally extended cylindrical member for conducting said eddy currents, and (2) a fan member integrally formed on one end of said cylindrical member in one-piece formation for dissipating said heat;

a magnetic conducting ring having a longitudinally extended cylindrical contour coupled in contiguous interfacing relationship to said cylindrical member;

permanent magnet means slidably mounted within said housing in spaced relation to said magnet conducting ring for establishing a magnetic field coupling therebetween, said cylindrical member being disposed between said magnetic conducting ring and said permanent magnet means and in spaced coaxial relationship with said permanent magnet means, said permanent magnet means includes (1) a mounting ring member, (2) a plurality of permanent magnets fixedly coupled to said mounting ring member, and (3) means for displacing said plurality of permanent magnets coupled to said mounting ring member, said permanent magnet displacement means being slidably coupled to said rotatably driven shaft; and an actuating wire member coupled to said permanent magnet displacement means, whereby axial displacement of said actuating wire member axially displaces said permanent magnet means with respect to said cylindrical member for varying a braking force responsive to a variation in a magnitude of said eddy currents conducted in said cylindrical member.

2. The adjustable magnetic brake as recited in claim 1 where said magnetic conducting ring is disposed on an external surface of said cylindrical member.

3. The adjustable magnetic brake as recited in claim 1 where said magnetic conducting ring is disposed on an internal surface of said cylindrical member.

* * * * *